United States Patent
Sugiyama et al.

(10) Patent No.: US 9,494,827 B2
(45) Date of Patent: Nov. 15, 2016

(54) LIQUID CRYSTAL DEVICE, ELECTRONIC APPARATUS, AND METHOD FOR MANUFACTURING LIQUID CRYSTAL DEVICE

(71) Applicant: Japan Display Inc., Tokyo (JP)

(72) Inventors: Hiroki Sugiyama, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 1 day.

(21) Appl. No.: 14/541,457

(22) Filed: Nov. 14, 2014

(65) Prior Publication Data
US 2015/0138460 A1 May 21, 2015

(30) Foreign Application Priority Data
Nov. 15, 2013 (JP) .................................. 2013-237421

(51) Int. Cl.
| | | |
|---|---|---|
| *H01L 21/00* | (2006.01) | |
| *H01J 9/50* | (2006.01) | |
| *G02F 1/1337* | (2006.01) | |
| *G02F 1/29* | (2006.01) | |
| *G02B 27/22* | (2006.01) | |
| *G02F 1/1339* | (2006.01) | |
| *H04N 13/04* | (2006.01) | |

(52) U.S. Cl.
CPC ....... *G02F 1/13378* (2013.01); *G02B 27/2214* (2013.01); *G02F 1/133784* (2013.01); *G02F 1/133788* (2013.01); *G02F 1/29* (2013.01); *G02F 1/13394* (2013.01); *G02F 2001/294* (2013.01); *H04N 13/0404* (2013.01)

(58) Field of Classification Search
CPC .......... G02F 1/13378; G02F 2/72214; G02F 1/12278; G02F 1/29; G02F 1/13394; G02F 2001/294
See application file for complete search history.

(56) References Cited

U.S. PATENT DOCUMENTS

| | | | |
|---|---|---|---|
| 7,245,344 B2 * | 7/2007 | Otani | G02F 1/1333 349/155 |
| 2008/0049180 A1 * | 2/2008 | Kim | G02F 1/1337 349/126 |
| 2010/0259697 A1 * | 10/2010 | Sakamoto | G02B 27/2214 349/15 |

FOREIGN PATENT DOCUMENTS

| | | |
|---|---|---|
| JP | 2000-214424 | 8/2000 |
| JP | 2012-173517 | 9/2012 |
| JP | 2013-195994 | 9/2013 |

* cited by examiner

*Primary Examiner* — Tracie Y Green
(74) *Attorney, Agent, or Firm* — K&L Gates LLP

(57) ABSTRACT

A liquid crystal device including: a first substrate, the first substrate being transparent; a second substrate disposed opposite the first substrate, the second substrate being transparent; a liquid crystal layer provided between the first substrate and the second substrate, the liquid crystal layer including liquid crystal molecules; an alignment film with alignment treatment such that the liquid crystal molecules align, the alignment film being provided on a surface of the first substrate, the surface facing the liquid crystal layer; and pillar spacers provided on the alignment film, wherein the alignment treatment is applied to the alignment film except at least a part of area in which each of the pillar spacers overlaps with the alignment film.

8 Claims, 11 Drawing Sheets

LIQUID CRYSTAL DEVICE, ELECTRONIC APPARATUS, AND METHOD FOR MANUFACTURING LIQUID CRYSTAL DEVICE

CROSS REFERENCES TO RELATED APPLICATIONS

The present application claims priority to Japanese Priority Patent Application JP 2013-237421 filed in the Japan Patent Office on Nov. 15, 2013, the entire content of which is hereby incorporated by reference.

BACKGROUND

1. Field of the Invention

The present disclosure relates to a liquid crystal device, an electronic apparatus provided with the liquid crystal device, and a method for manufacturing the liquid crystal device.

2. Description of the Related Art

In a liquid crystal display (LCD), there has been a device capable of displaying a stereoscopic image viewable with the naked eyes of a user. This type of liquid crystal display includes a mechanism that arranges a liquid crystal device such as a variable lens array on the surface of the liquid crystal display that displays an image thereon as a mechanism that generates parallax in user's eyes. The liquid crystal display having a variable lens array utilizes the refractive index of the liquid crystal of the variable lens array to divide an image displayed on an image display device into two in conformity with a right-and-left parallax and generate a parallax of the images that reach respective right-and-left eyes of a user thus constituting an image that is stereophonically viewable.

When the liquid crystal device constitutes the variable lens array, a pair of substrates needs to be separated with a predetermined distance therebetween. The liquid crystal layer of the variable lens array becomes considerably thicker compared with a liquid crystal layer of a general liquid crystal display panel. On the other hand, the liquid crystal device has a structure such that spacers are provided between two substrates that sandwich a liquid crystal layer to maintain the thickness of the liquid crystal layer.

As a spacer provided in a liquid crystal device, there have been a pillar spacer described in Japanese Patent Application Laid-open Publication No. 2000-214424 and scattered spacers, where spherical spacers are scattered, described in Japanese Patent Application Laid-open Publication No. 2012-173517.

It is difficult to control the positions at which the scattered spacers are arranged and arrange the scattered spacers at predetermined positions with respect to an electrode pattern. When the spacers are positioned at random, a liquid crystal lens varies in shape depending on the position thereof and hence, there may be a case that the characteristics of the lens are unstable. On the other hand, the pillar spacers can be formed in a desired pattern by the process that uses lithography and etching.

The liquid crystal device of the variable lens array uses, for example, a vertical alignment (VA) mode liquid crystal. Liquid crystal molecules of the liquid crystal device are aligned in such a manner that the major axis direction thereof is aligned along a direction perpendicular to the surface of the substrate when applying no voltage (in an OFF state), and aligned in such a manner that the liquid crystal molecules tilt (incline) depending on the level of the voltage when applying a voltage (in an ON state). Accordingly, in the state of applying no voltage, when a voltage is applied to a liquid crystal layer and the liquid crystal molecules aligned in the direction perpendicular to the surface of the substrate tilt, the liquid crystal molecules tilt in arbitrary directions, giving rise to the possibility of the alignment disorder of the liquid crystal molecules and the occurrence of an abnormal alignment (a reverse twisted domain, for example). In particular, in the liquid crystal device using pillar spacers, there may be a case that the abnormal alignment easily occurs. In the place in which the abnormal alignment occurs, the failure with a display defect occurs and thus causes deterioration in yield.

SUMMARY

According to an aspect of the invention, a liquid crystal device is provided. The liquid crystal device includes: a first substrate, the first substrate being transparent; a second substrate disposed opposite the first substrate, the second substrate being transparent; a liquid crystal layer provided between the first substrate and the second substrate, the liquid crystal layer including liquid crystal molecules; an alignment film with alignment treatment such that the liquid crystal molecules align, the alignment film being provided on a surface of the first substrate, the surface facing the liquid crystal layer; and pillar spacers provided on the alignment film, wherein the alignment treatment is applied to the alignment film except at least a part of area in which each of the pillar spacers overlaps with the alignment film.

The electronic apparatus of the present disclosure is provided with the above-mentioned liquid crystal device, and corresponds, for example, to a handheld terminal device or a handheld information terminal, such as a car navigation device, a television apparatus, a digital camera, a personal computer, a video camera, a mobile phone, and a portable game machine.

According to another aspect of the invention, a method for manufacturing a liquid crystal device is provided. The liquid crystal device includes a first substrate, the first substrate being transparent; a second substrate disposed opposite the first substrate, the second substrate being transparent; a liquid crystal layer provided between the first substrate and the second substrate, the liquid crystal layer including liquid crystal molecules; an alignment film with alignment treatment such that the liquid crystal molecules align, the alignment film being provided on a surface of the first substrate, the surface facing the liquid crystal layer; and pillar spacers provided on the alignment film, wherein the alignment treatment is applied to the alignment film except at least a part of area in which each of the pillar spacers overlaps with the alignment film. The method includes: forming a film to be an alignment film on the first substrate; forming pillar spacers on the film; and applying alignment treatment to the film the pillar spacers having been formed thereon, so that the film comes into the alignment film.

According to the liquid crystal device, the electronic apparatus, and the method for manufacturing the liquid crystal device in the present disclosure, failures due to an abnormal alignment and the deterioration in yield can be suppressed.

Additional features and advantages are described herein, and will be apparent from the following Detailed Description and the figures.

DETAILED DESCRIPTION

Hereinafter, with reference to drawings, the present disclosure is explained based on embodiments. The present disclosure is not limited to the embodiments, and various numerical values and materials in the embodiments are merely exemplified. In the following explanation, parts identical with each other or parts having the identical functions are given same numerals, and their repeated explanations are omitted.

Figure 1:
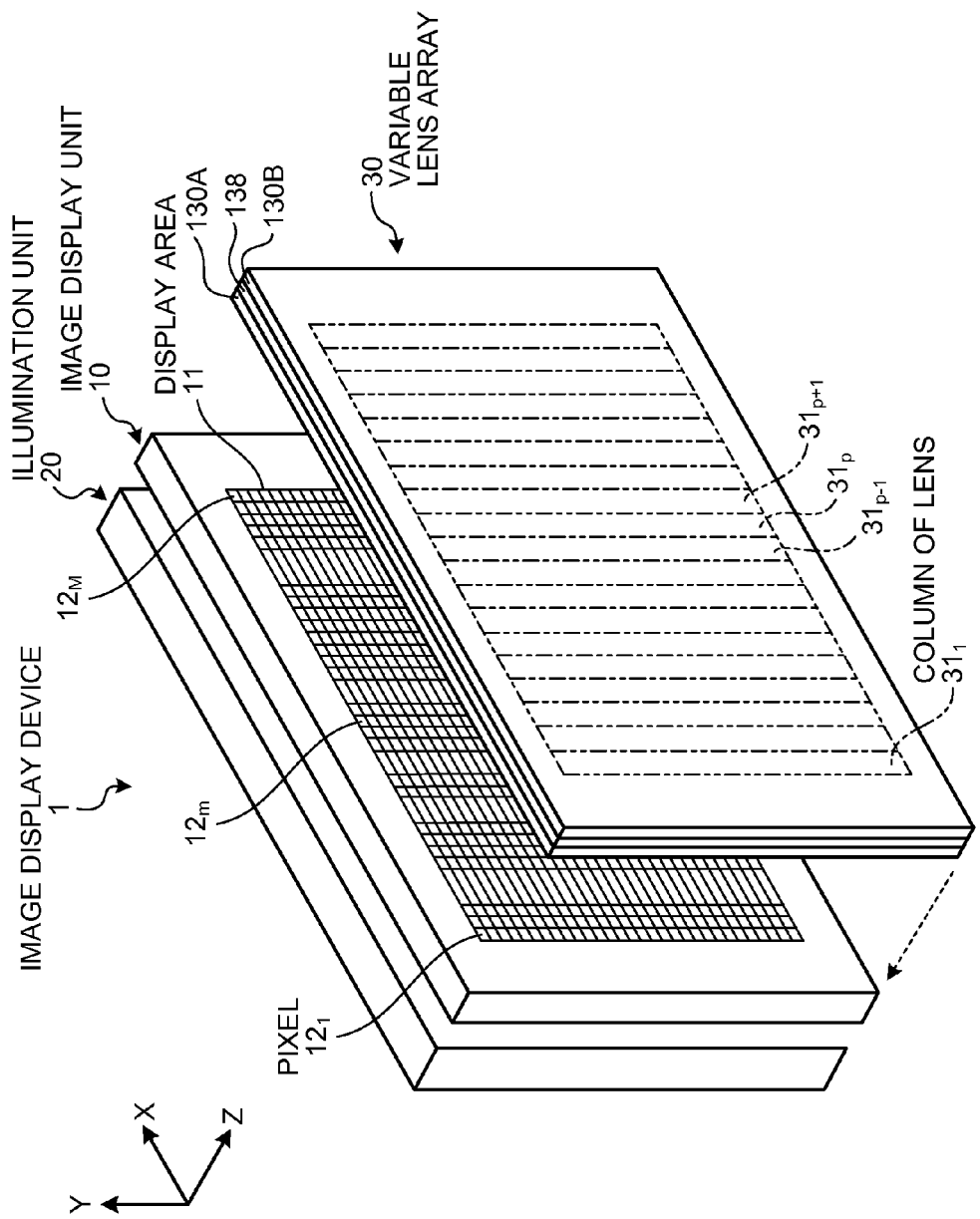
FIG. 1 is an exploded schematic perspective view of an image display device according to the embodiment.

FIG. 1 is an exploded schematic perspective view of an image display device according to the present embodiment. As illustrated in FIG. 1, an image display device 1 is provided with an image display unit 10 that displays a two-dimensional image, an illumination unit 20, and a variable lens array (a liquid crystal device) 30.

The image display unit 10 displays a two-dimensional image thereon. The image display unit 10 includes a display area 11 having M pieces of pixels 12 arranged in the X direction illustrated in FIG. 1 and N pieces of pixels 12 arranged in the Y direction illustrated in FIG. 1. The pixel 12 in the m-th row (where, m=1, 2, . . . , M) is expressed as a pixel $12_m$. The image display unit 10 in the present embodiment is a liquid crystal display panel. Here, as the image display unit 10, a well-known image display device such as an electroluminescence display panel or a plasma display panel can be used. The image display unit 10 may display a monochrome image and may also display a color image. The liquid crystal display panel comprises, for example, a front panel provided with transparent common electrodes, a rear panel provided with transparent pixel electrodes, and a liquid crystal material arranged between the front panel and the rear panel. The operational mode of the liquid crystal display panel is not particularly limited. The liquid crystal display panel may be driven in a so-called TN mode, and may be driven in a VA mode or in an IPS mode.

Figure 2:
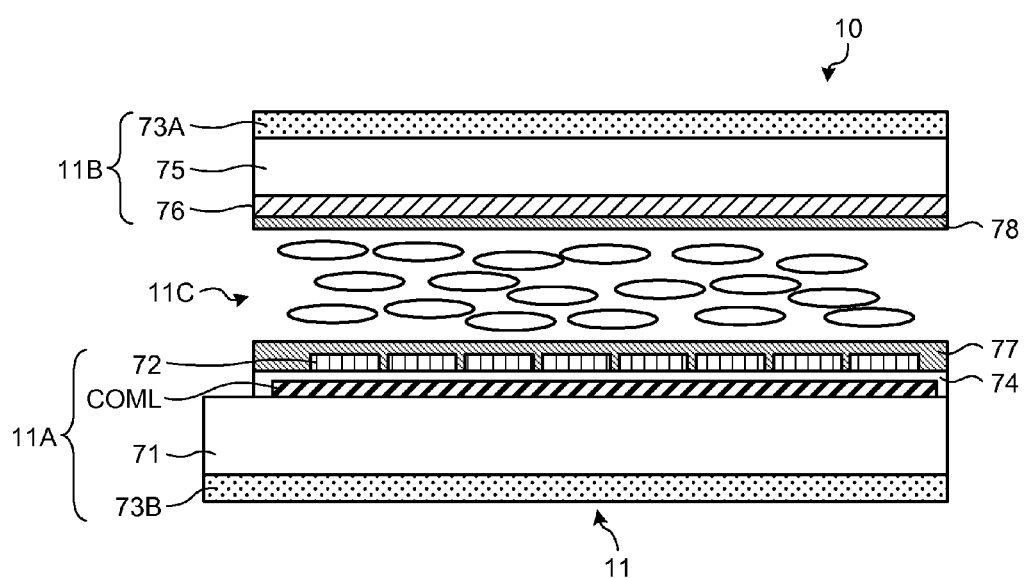
FIG. 2 is a sectional view illustrating the schematic section structure of an image display unit.

FIG. 2 is a sectional view illustrating the schematic section structure of the image display unit. As illustrated in FIG. 2, the display area 11 of the image display unit 10 is provided with a pixel substrate 11A, a counter substrate 11B arranged in an opposed manner in the direction perpendicular to the surface of the pixel substrate 11A, and a liquid crystal layer 11C inserted into a space between the pixel substrate 11A and the counter substrate 11B. In the image display unit 10, a distance between the pixel substrate 11A and the counter substrate 11B is approximately 3 µm to 4 µm, for example.

The liquid crystal layer 11C modulates a light passing therethrough depending on a state of an electric field and, for example, liquid crystals in various kinds of modes such as Twisted Nematic (TN), Vertical Alignment (VA), Electrically Controlled Birefringence (ECB), and Fringe Field Switching (FFS) are used for the liquid crystal layer 11C.

The counter substrate 11B includes a glass substrate 75 and a color filter 76 formed on one surface of the glass substrate 75. A polarizer 73A is arranged on the other surface of the glass substrate 75. The color filter 76 includes color regions colored in the three colors of red (R), green (G), and blue (B). The color filter 76 cyclically arranges therein the respective color regions that are colored in the three colors of red (R), green (G), and blue (B). Color regions colored in the three colors of R, G, and B correspond to each pixel as one set of pixel. The color filter 76 faces the liquid crystal layer 11C in an opposed manner in a direction perpendicular to a TFT substrate 71. The color filter 76 may use any other colors in combination provided that the colors are different from each other. Generally, in the color filter 76, the luminance of the color region of green (G) is higher than that of each of the color region of red (R) and the color region of blue (B). A common electrode COML is a transparent electrode formed of a transparent conductive material (transparent conducting oxide), such as Indium Tin Oxide (ITO).

The pixel substrate 11A includes the TFT substrate 71 as a circuit board, a plurality of pixel electrodes 72 arranged in a matrix array on the TFT substrate 71, a common electrode COML formed in between the TFT substrate 71 and the pixel electrode 72, an insulating layer 74 that insulates the pixel electrode 72 from the common electrode COML, and an incident-side polarizer 73B arranged on the bottom side of the TFT substrate 71. A first alignment film 77 is arranged in between the liquid crystal layer 11C and the pixel substrate 11A. A second alignment film 78 is arranged in between the liquid crystal layer 11C and the counter substrate 11B.

The image display unit 10 is driven by a drive circuit that is not illustrated in the drawings, and controls the alignment direction of liquid crystal molecules in a pixel thus displaying a two-dimensional image corresponding to a video signal from the outside.

The illumination unit 20 that radiates light is arranged on the back side of the image display unit 10. The illumination unit 20 is provided with members such as a light source, a prism sheet, a diffusion sheet, and a light guide plate (these members are not illustrated in the drawings). As the illumination unit 20, a well-known illumination unit can be used. The illumination unit 20 is not limited in particular.

Figure 3:
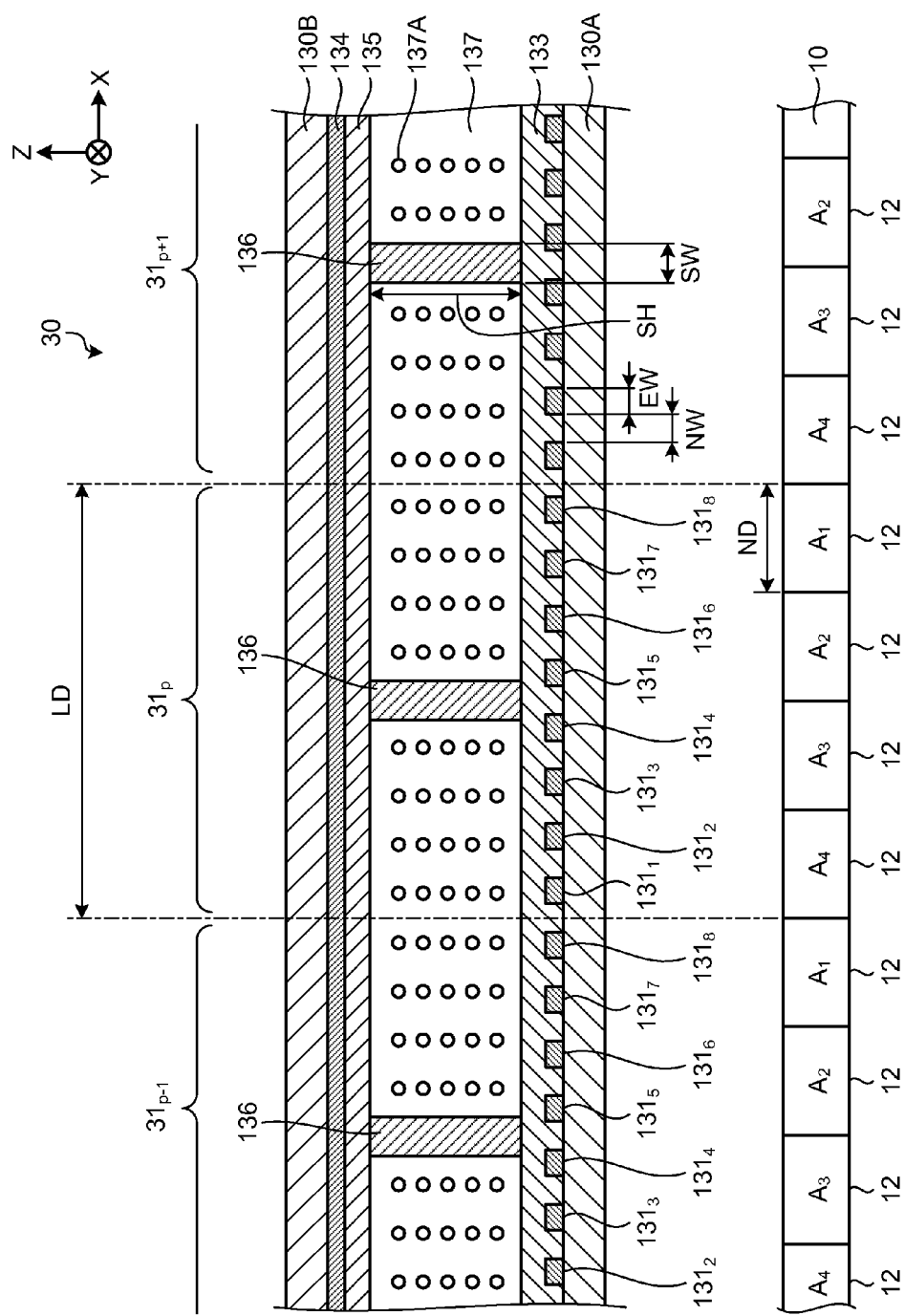
FIG. 3 is a sectional view illustrating the schematic section structure of a variable lens array.
Figure 4:
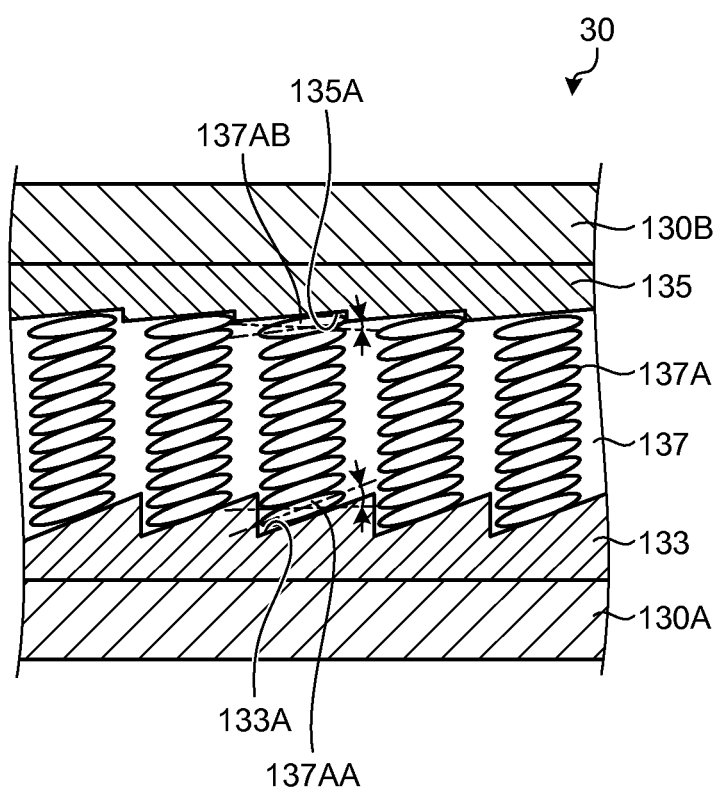
FIG. 4 is a schematic view illustrating the pre-tilt angle of liquid crystal molecules.
Figure 5:
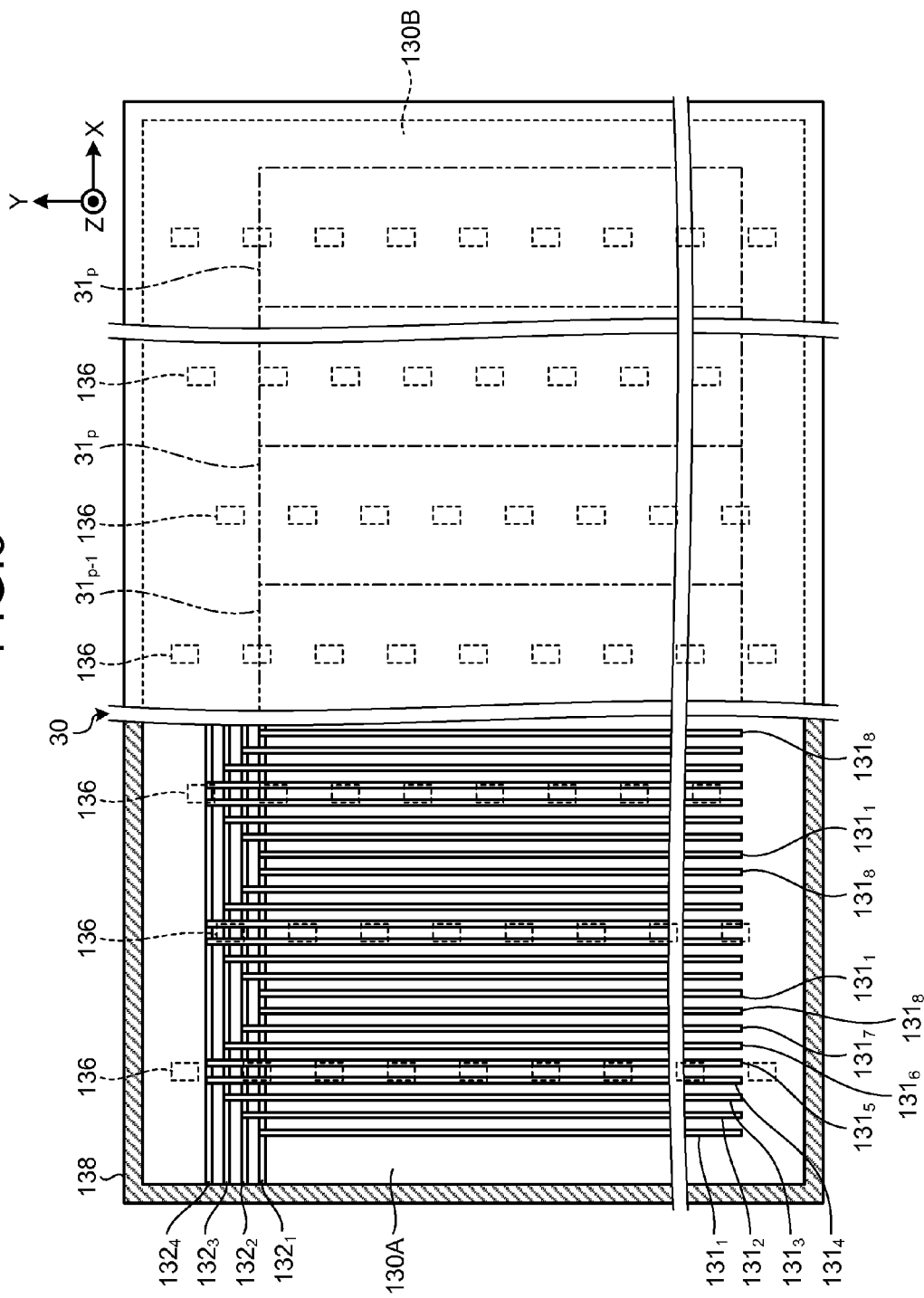
FIG. 5 is a schematic plan view of the variable lens array as viewed in a front view.
Figure 6:
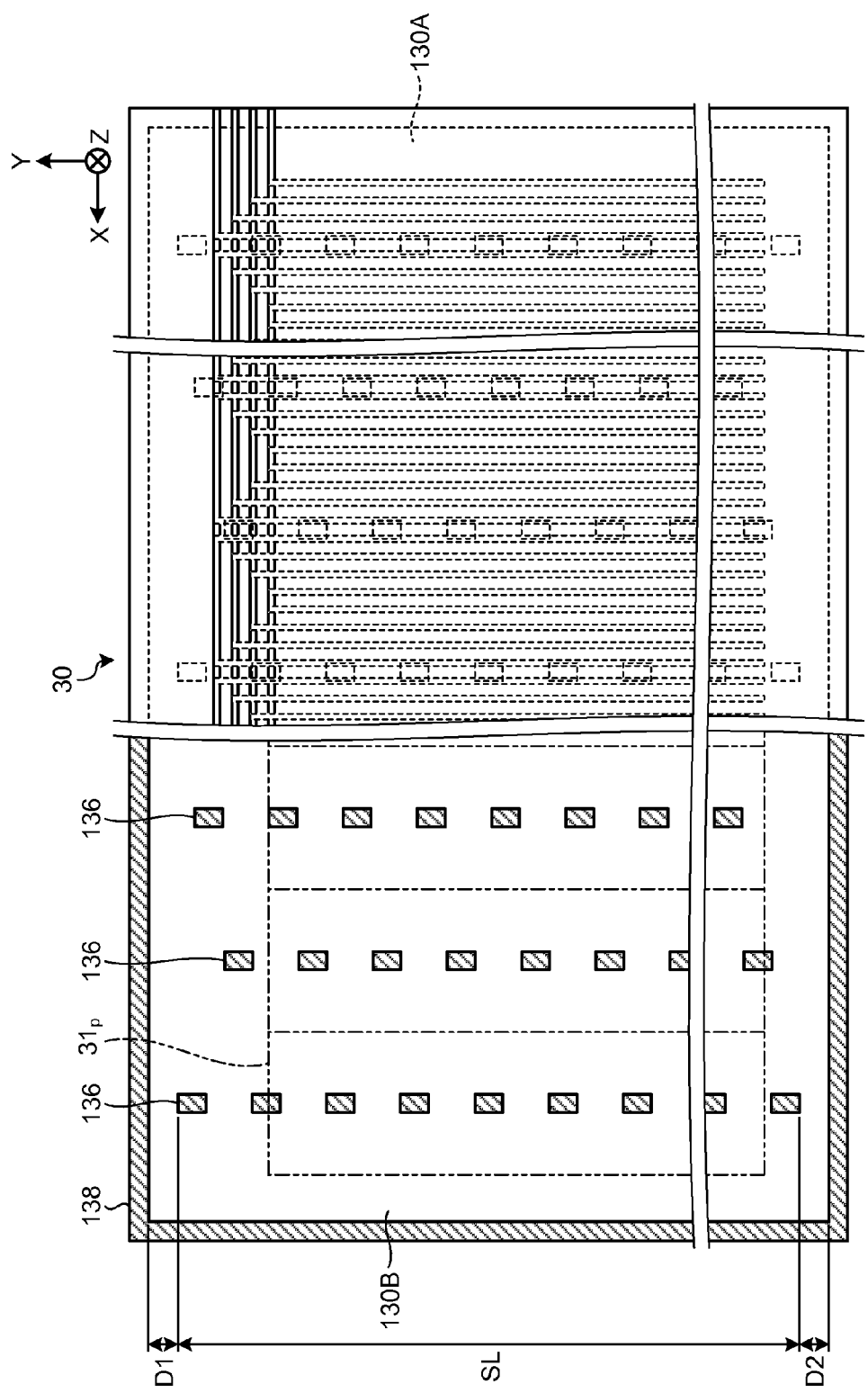
FIG. 6 is a schematic plan view of the variable lens array as viewed in a rear view.

Next, in conjunction with FIG. 1 and FIG. 3 to FIG. 6, the variable lens array 30 is explained. FIG. 3 is a sectional view illustrating the schematic section structure of the variable lens array. FIG. 4 is a schematic view illustrating the pretilt angle of liquid crystal molecules. FIG. 5 is a schematic plan view of the variable lens array as viewed in a front view. FIG. 6 is a schematic plan view of the variable lens array as viewed in a rear view. FIG. 5 is a view with a part cut out of a second substrate 130B. FIG. 6 is a view with a part cut out of a first substrate 130A.

As illustrated in FIG. 3, the variable lens array 30 is provided with the first substrate 130A, the second substrate 130B, and a liquid crystal layer 137 arranged in between the first substrate 130A and the second substrate 130B. A sealing member 138 is formed in the circumferences of the surfaces of the first substrate 130A and the second substrate 130B that face each other in an opposed manner, and has a mechanism of sealing between the first substrate 130A and the second substrate 130B.

A material with high light transmissivity can be used for the first substrate 130A and the second substrate 130B. As a material that forms each of the first substrate 130A and the second substrate 130B, for example, acrylic resin, polycarbonate resin (PC), ABS resin, polymethyl methacrylate resin (PMMA), polyarylate resin (PAR), polyethylene terephthalate resin (PET), or glass can be exemplified. The materials of the first substrate 130A and the second substrate 130B may be identical with each other, and may be different from each other.

The variable lens array 30 is arranged to face the front face of the image display unit 10 in an opposed manner, and held by a holding member that is not illustrated in the drawings so that the variable lens array 30 and the image display unit 10 are separated with a predetermined distance therebetween in terms of specification. The front face of the image display unit 10 means the face closer to an image viewer who views an image displayed on the image display unit 10. As described later, spacers (pillar spacers) 136 are arranged in between the first substrate 130A and the second substrate 130B of the variable lens array 30, at the place such that the alignment direction of the liquid crystal molecules in the liquid crystal layer 137 does not change when the refractive index of each of columns of lens 31 is changed.

In the variable lens array 30, P pieces of the columns of lens (variable column of lens) 31 extending in the Y direction illustrated in FIG. 1 are arranged next to each other in the X direction illustrated in FIG. 1. The p-th row (where, p=1, 2, . . . , P) of the column of lens 31 is expressed as a column of lens $31_p$. The column of lens $31_p$ is adjacent to a column of lens $31_{p-1}$ and a column of lens $31_{p+1}$. The relationship between "P" and "M" mentioned above is described later.

For the sake of convenience of the explanation, it is assumed that the number of viewpoints on the image when displaying a stereoscopic image is four (4); that is, viewpoints A1, A2, . . . , and A4, in a central viewing area. However, this assumption merely constitutes one exemplification. The number of viewing areas and the number of viewpoints can be appropriately set depending on the specification of the image display device 1. By appropriately setting the positional relationship between the image display unit 10 and the column of lens 31, or the like, the image for each viewpoint becomes viewable also in the areas on the left side and the right side of the central viewing area.

As illustrated in FIG. 3, the variable lens array 30 that is a liquid crystal device is provided with the column of lens 31 each of which changes the alignment direction of the liquid crystal molecules in the liquid crystal layer 137 by a voltage applied between a first electrode 131 and a second electrode 134 thus changing the refractive index thereof. The variable lens array 30 includes the first substrate 130A having first electrodes $131_1$, $131_2$, . . . , and $131_8$, the second substrate 130B having the second electrode 134, and the liquid crystal layer 137 arranged in between the first substrate 130A and the second substrate 130B. The first electrodes $131_1$, $131_2$, . . . , and $131_8$ may be referred to collectively as the first electrode 131. Other constitutional features may also be referred to in the same manner as above.

The first electrode 131 and the second electrode 134 are formed on the respective surfaces (inner surfaces) on the liquid-crystal-layer-137-sides of the first substrate 130A and the second substrate 130B. The liquid crystal layer 137 is composed of a positive nematic liquid crystal material. The liquid crystal layer 137 in the present embodiment uses a homogeneously aligned liquid crystal material.

Each of the first electrode 131 and the second electrode 134 is formed of a transparent conductive material such as ITO, and formed by film formation. The first electrode 131 is formed in a predetermined striped shape illustrated in FIG. 5 by patterning. The second electrode 134 is a so-called common electrode, and is formed on the whole surface of the second substrate 130B. For the sake of convenience, in FIG. 6, the illustrations of the second electrode 134 and a second alignment film 135 described later are omitted. In FIG. 5 also, the illustration of a first alignment film 133 described later is omitted.

As illustrated in FIG. 3, the first alignment film 133 that covers the whole surface of the first substrate 130A including the first electrode 131 is formed on the first substrate 130A, and the second alignment film 135 that covers the whole surface of the second substrate 130B including the second electrode 134 is formed on the second substrate 130B. Each of the alignment films is, for example, formed of a polyimide material, and alignment treatment such as rubbing treatment is applied to the surface of each alignment film. The first alignment film 133 and the second alignment film 135 specify the direction of the molecular axis of liquid crystal molecules 137A in a state that an electric field is not applied. With respect to the first alignment film 133 and the second alignment film 135, the alignment treatment described below is applied; that is, the alignment treatment turns the longitudinal axis of the liquid crystal molecules 137A to the Y direction in a state that an electric field is not applied to the liquid crystal molecules 137A, and turns the longitudinal axis of the liquid crystal molecules 137A to the Z direction in a state that an electric field is applied to the liquid crystal molecules 137A. FIG. 3 illustrates the alignment of the liquid crystal molecules 137A to which the electric field is not applied. A predetermined voltage is applied to the second electrode 134 from a drive circuit that is not illustrated in the drawings.

As illustrated in FIG. 4, in the first alignment film 133, grooves 133A are formed by alignment treatment. Liquid crystal molecules 137AA that are in the vicinity of the first alignment film 133 have a pretilt angle such that the groove 133A tilts the corresponding liquid crystal molecule 137AA by a predetermined angle with respect to the surface of the first substrate 130A. In the second alignment film 135, grooves 135A are formed by the alignment treatment. Liquid crystal molecules 137AB that are in the vicinity of the second alignment film 135 have a pretilt angle such that the corresponding groove 135A tilts the liquid crystal molecule 137AB by a predetermined angle with respect to the surface of the second substrate 130B. Depending on specifications, the groove 133A formed in the first alignment film 133 and the groove 135A formed in the second alignment film 135 may be formed in the identical shape so that the pretilt angles thereof are identical with each other. FIG. 4 illustrates an example that performs rubbing treatment as the alignment treatment. As the alignment treatment, photo alignment treatment may be performed.

In FIG. 3, one column of lens 31 basically corresponds to pixels 12 in four rows. When the respective pitches of the column of lens 31 and the pixels 12 in the X direction illustrated in FIG. 1 are expressed as a numeral LD and a numeral ND, the relationship between the numeral LD and the numeral ND is such that LD≈4×ND in the case of the 3D of four viewpoints, and the relationship between the numeral LD and the numeral ND is such that LD≈2×ND in the case of the 3D of two viewpoints. The relationship between "P" and "M" that are mentioned above is such that P≈M/4.

As illustrated in FIG. 3 and FIG. 5, in one column of lens 31, the first electrodes $131_1$, $131_2$, ..., and $131_8$ each of which is formed in a stripe shape extending in the Y direction illustrated in FIG. 3 and FIG. 5 are arranged. As illustrated in FIG. 3, the first electrodes 131 are arranged next to each other in the X direction separated with a predetermined distance NW therebetween. A numeral EW indicates the width of the first electrode 131 in the X direction. The relationship among the lens-row pitch LD, the distance NW, and the width EW is such that LD=8×(NW+EW). The number of the first electrodes 131 corresponding to one column of lens 31 is not limited to eight (8), and may be appropriately changed depending on the specification of the variable lens array 30. The values of the distance NW and the width EW are not limited in particular, and may be, for example, appropriately set to preferred values in consideration of film formation and patterning techniques. In the present embodiment, the second electrode 134 is a planar electrode formed on the whole surface of the second substrate 130B. However, when there is at least one electrode between two columns of lens 31 adjacent to each other, the column of lens 31 can be formed. Accordingly, it is necessary only to form at least one second electrode 134 between two columns of lens 31 adjacent to each other, and it is unnecessary to form the second electrode 134 on the whole surface of the second substrate 130B. When the second electrode 134 is formed in a stripe shape, the second electrode 134 can be formed in the direction orthogonal to the direction in which the first electrode 131 extends. Due to the structure mentioned above, a variable lens suitable for 3D viewing is obtained. The second electrode 134 may be formed in parallel with the direction in which the first electrode 131 extends.

As illustrated in FIG. 5, on the surface of the first substrate 130A, electric supply lines $132_1$, $132_2$, ..., and $132_4$ each of which extends in a stripe shape in the X direction illustrated in FIG. 5 are further provided. The electric supply lines $132_1$ to $132_4$ are also formed basically by the same manufacturing process as the case of the first electrode 131. The first electrodes $131_1$ and $131_8$ are connected to the electric supply line $132_1$, and the first electrodes $131_2$ and $131_7$ are connected to the electric supply line $132_2$. The first electrodes $131_3$ and $131_6$ are connected to the electric supply line $132_3$, and the first electrodes $131_4$ and $131_5$ are connected to the electric supply line $132_4$. In FIG. 5, the illustration of a contact between an electric supply line 132 and the electrode 131 is omitted.

As can be clearly understood from the above-mentioned connection relation, the voltage of each of the first electrodes $131_1$ and $131_8$ is controlled by a voltage applied to the electric supply line $132_1$, and the voltage of each of the first electrodes $131_2$ and $131_7$ is controlled by a voltage applied to the electric supply line $132_2$. The voltage of each of the first electrodes $131_3$ and $131_6$ is controlled by a voltage applied to the electric supply line $132_3$, and the voltage of each of the first electrodes $131_4$ and $131_5$ is controlled by a voltage applied to the electric supply line $132_4$. The independent voltage is applied to each of the electric supply lines $132_1$, $132_2$, ..., and $132_4$ from a drive circuit that is not illustrated.

Each of the first electrode 131 of the first substrate 130A and the second electrode 134 of the second substrate 130B can be composed of a transparent conductive material such as a metallic thin film having a light transmissive property, an indium tin oxide (ITO), or an indium zinc oxide (IZO). Each of the first electrode and the second electrode can be formed in a film-like shape by a physical vapor deposition method (PVD method) such as a vacuum evaporation method or a spattering method, or various kinds of chemical vapor deposition methods (CVD methods). The first electrode 131 and the second electrode 134 can be patterned by a well-known method such as a combination of a photo-lithograph method and an etching method, or a lift-off method.

As illustrated in FIG. 3 and FIG. 6, spacers 136 are arranged in the respective column of lens 31. In the present embodiment also, as illustrated in FIG. 5 and FIG. 6, the spacer 136 is a spacer with an aspect ratio close to one (1) in an XY plane. The spacers 136 are arranged in the central area of the column of lens 31 in the X direction and at random in the Y direction. Although the spacer 136 in the present embodiment has a rectangular (rectangle) shape in the XY plane, the shape of the spacer 136 is not limited to this example. The spacer 136 can be formed into various shapes such as a circular shape, an oval shape, or a polygonal shape in the XY plane. The spacer 136 can be formed in a shape extending in one direction (in the Y direction, for example) so as to be constituted by being arranged in a wall-like shape.

The spacer 136 is arranged in a predetermined place on the first alignment film 133 of the first substrate 130A. That is, the spacer 136 is formed on the first alignment film 133, and exposed in the liquid crystal layer 137. The spacer 136 is formed of a transparent polymeric material, and formed by the exposure and development (etching) of a photosensitive spacer-formation-use material layer arranged on the first alignment film 133. The manufacturing process of the spacer 136 is described later.

In the present embodiment, the spacer 136 is arranged on the surface of the first alignment film 133 located in the central area of the column of lens 31. With respect to a line that passes through the center of the spacer 136, the first electrode $131_1$ and the first electrode $131_8$ are arranged symmetrically, and the first electrode $131_2$ and the first electrode $131_7$ are arranged symmetrically. Other first electrodes may also be arranged in the same manner as above.

The variable lens array 30 can arrange the spacer 136 in the central area of the column of lens 31 thus arranging the spacer 136 in such a place that the alignment direction of the liquid crystal molecules in the liquid crystal layer 137 does not change when the refractive index of the column of lens 31 is changed. The spacer 136 is arranged in such a place that the alignment direction of the liquid crystal molecules of the liquid crystal layer 137 does not change when the refractive index of column of lens 31 is changed thus maintaining the performance of the liquid crystal molecules as a lens high even when the spacer 136 is provided. The case where "the alignment direction of liquid crystal molecules does not change" includes a case where the alignment direction of liquid crystal molecules does not change substantially in addition to a case where the alignment direction of liquid crystal molecules does not change strictly. That is, the existence of various kinds of variations in alignment direction of the liquid crystal molecules that arise in specification or manufacture is acceptable. Although it is preferable to configure a spacer to be arranged in the central area of the column of lens in the present embodiment, the spacer may be arranged in the boundary area of the column of lens adjacent to each other.

As illustrated in FIG. 3, the width of the spacer 136 in the X direction (a direction orthogonal to the direction in which the spacer 136 extends) is expressed as SW, and the height of the spacer 136 in the Z direction (a distance in the direction toward the second substrate 130B from the first substrate 130A) is expressed as SH. In this case, it is preferable to set the height SH of the spacer 136 in the range from 5 μm to 50 μm. The height of the spacer 136 is set in the above-mentioned range thus enhancing the lens function of the variable lens array 30. As for the width SW and the height SH of the spacer 136, it is preferable to satisfy a relationship such that 0.5≤SH/SW≤5. The aspect ratio between the width SW and the height SH of the spacer 136 is set to 1 (one) or larger thus maintaining the height of the liquid crystal layer 137; that is, the distance between the first substrate 130A and the second substrate 130B, at a fixed value, while reducing an influence on the liquid crystal layer 137.

The first alignment film 133 of which the spacers 136 are arranged on the surface has a portion in which alignment treatment is not applied to at least a part of the areas on which the spacers 136 are arranged.

The variable lens array 30 is, as illustrated in FIG. 1 to FIG. 6, sealed with a sealing part 138 composed of an epoxy resin material or the like around the outer peripheral portion of the first substrate 130A and the outer peripheral portion of the second substrate 130B. As illustrated in FIG. 6, the length SL of an area in which the spacers 136 are arranged is set to a value such that the end portion of the spacer 136 and the sealing part 138 are spaced apart from each other with a distance D1 or D2 therebetween. The value of the distance D1 or D2 is a value such that a liquid crystal material flows between substrates without any trouble in manufacturing the variable lens array 30. In the variable lens array 30, the end portion of the spacer 136 and a sealing part are spaced apart from each other thus ensuring the fluidity of a liquid crystal material.

The variable lens array 30 is driven by a drive circuit, and the refractive index of the column of lens 31 is set to each of a predetermined value when a stereoscopic image is displayed and another predetermined value when a normal image is displayed. The pretilt angle of the first alignment film 133 of the first substrate 130A on which the electric supply line 132 that applies an electric field to the liquid crystal molecules 137A for giving a curvature to the column of lens 31 is formed may be set larger than the pretilt angle of the 2nd alignment film 135 of the second substrate 130B on which the electric supply line 132 is not formed. Due to such a constitution, excellent optical characteristics can be acquired.

Figure 7:
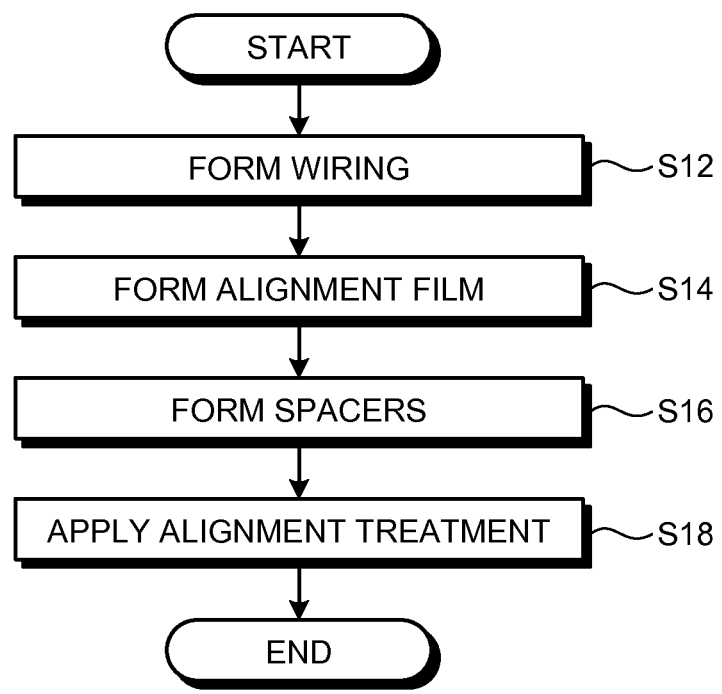
FIG. 7 is a flowchart for explaining one example of a method for manufacturing a liquid crystal device.
Figure 8:
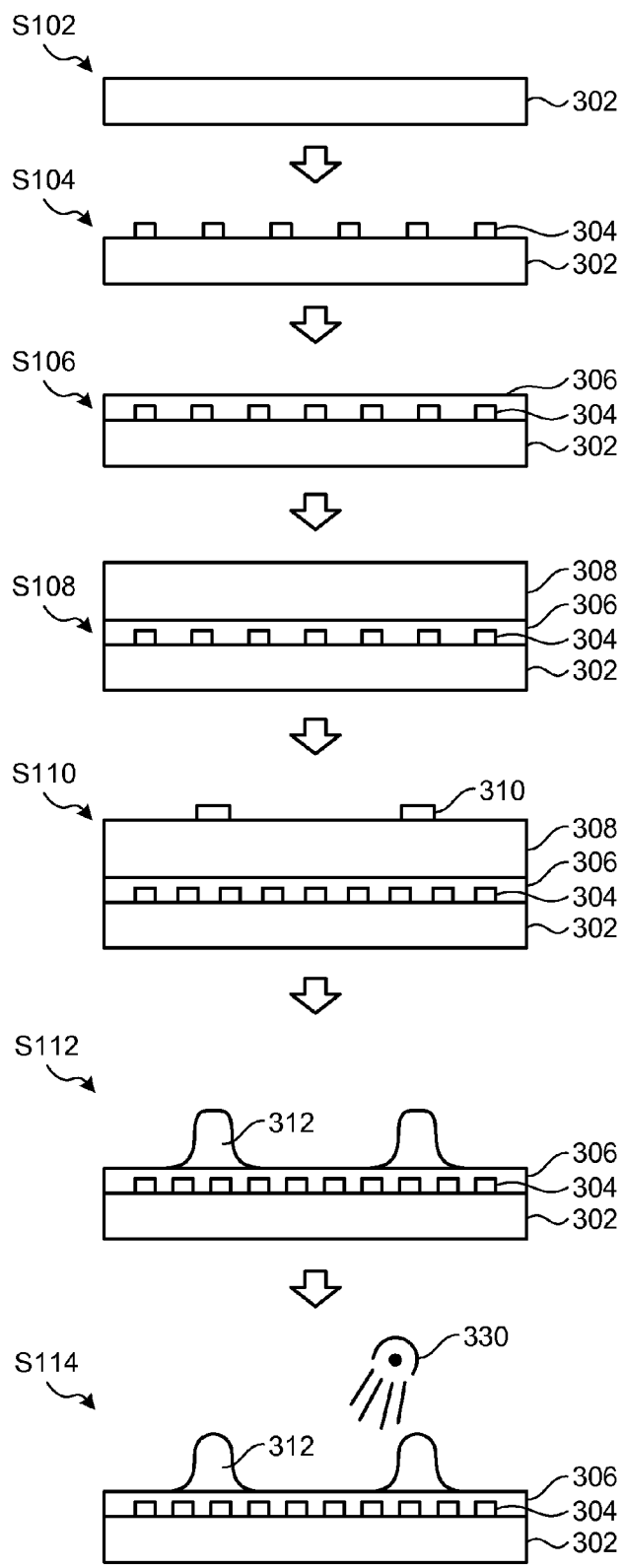
FIG. 8 is an explanatory view for explaining one example of the method for manufacturing the liquid crystal device.
Figure 9:
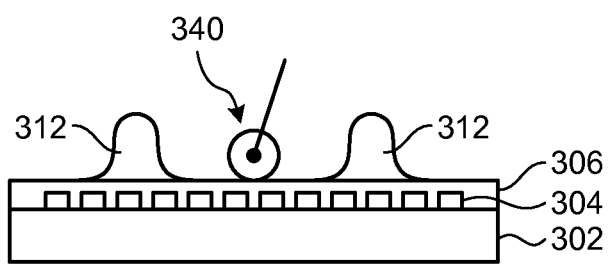
FIG. 9 is an explanatory view for explaining another example of the method for manufacturing the liquid crystal device.

Next, a method for manufacturing the variable lens array 30 is explained in conjunction with FIG. 7 to FIG. 9. FIG. 7 is a flowchart for explaining one example of a method for manufacturing a liquid crystal device. FIG. 8 is an explanatory view for explaining one example of the method for manufacturing the liquid crystal device. FIG. 9 is an explanatory view for explaining another example of the method for manufacturing the liquid crystal device.

In the method for manufacturing the liquid crystal device, various kinds of wiring are formed such as the first electrode 131, the first to fourth electric supply lines on the first substrate 130A (step S12). Next, in the method for manufacturing the liquid crystal device, an alignment film (a film that constitutes the first alignment film 133) is formed on the surface on which wiring is formed (step S14). The alignment film formed in this step assumes a state in which alignment treatment is not applied thereto. Next, in the method for manufacturing the liquid crystal device, spacers are formed on the alignment film to which the alignment treatment is not applied (step S16). In the method for manufacturing the liquid crystal device, the alignment treatment is applied to the alignment film after forming the spacers on the alignment film (step S18). In this manner, in the method for manufacturing the liquid crystal device, the first substrate 130A is manufactured. Furthermore, in the method for manufacturing the liquid crystal device, the second electrode 134 and the second alignment film 135 are formed appropriately on the surface of the second substrate 130B. The first substrate 130A and the second substrate 130B, which are processed in the above-mentioned process, are arranged to face each other in an opposed manner in a state that a liquid crystal material is sandwiched therebetween, and seals the circumference thereof thus acquiring the variable lens array 30.

In addition, when manufacturing the image display device, the variable lens array 30 manufactured by the method for manufacturing the liquid crystal device and the image display unit 10 are stacked on each other. In this case, it is preferable to join the variable lens array 30 and the image display unit 10 to each other with a transparent adhesive or the like. Thereafter, a unit constituted by stacking the variable lens array 30 and the image display unit 10 to each other is placed in a housing in which the illumination unit 20 is arranged and thereafter, various kinds of wiring are connected thus manufacturing the image display device.

Next, the method for manufacturing the first substrate 130A is explained more specifically in conjunction with FIG. 8. In the method for manufacturing the liquid crystal device, a substrate 302 that constitutes the first substrate 130A (step S102) is prepared, and wiring 304 on the substrate 302 is formed (step S104). The wiring 304 is a wiring pattern formed by performing evaporation, exposure, or etching of a metallic film that constitutes the wiring 304. The wiring 304 is not the single-layered wiring but the multilayered wiring such that wiring and insulating layers are alternately laminated.

In the method for manufacturing the liquid crystal device, the wiring 304 is formed and thereafter, a film 306 such as a polyimide (PI) film is formed, constituting an alignment film (step S106). The film 306 can be formed by the screen process printing or the ink jet printing. The film 306 is formed on the whole surface of the substrate 302 on which the wiring 304 is formed. When the film 306 is formed by the ink jet printing, it is unnecessary to form the film 306 on a part of the areas on which spacers are formed.

In the method for manufacturing the liquid crystal device, the film 306 is formed and thereafter, a material layer 308 is formed, which will become the spacers (step S108). The material layer 308 is composed of a transparent material having photosensitivity. In the method for manufacturing the liquid crystal device, the material layer 308 is formed and thereafter, a mask 310 is formed corresponding to the pattern of the spacers (step S110). The present embodiment exemplifies an example in the case where a positive photosensitive material is used for the material of the material layer 308. As the mask 310, a material that blocks the light is arranged at the position at which the spacer is arranged. When the positive photosensitive material is used for the material of the material layer 308, the area of the mask 310 on which the material that blocks the light is arranged is reversed; that is, the material that blocks the light is arranged at the position at which the spacer is not arranged. In the method for manufacturing the liquid crystal device, the mask 310 is formed and thereafter, the material layer 308 is exposed to the exposure light.

In the method for manufacturing the liquid crystal device, the material layer 308 is exposed to exposure light and thereafter, development treatment (etching) is performed (step S112). In the method for manufacturing the liquid crystal device, the development treatment (etching) is performed and hence, areas that are not irradiated with the exposure light remain on the material layers 308. Accordingly, the spacers 312 are formed on the film 306. The mask 310 may be removed together with the areas that are exposed to the exposure light on the material layer 308 when the development treatment is performed, or only the mask 310 may be removed by etching before the development treatment is performed. In etching, although it is preferable to perform wet etching using an alkaline fluid, dry etching may be performed. Etching can be easily performed by wet etching.

In the method for manufacturing the liquid crystal device, the spacers 312 are formed and thereafter, the alignment treatment is applied to the film 306 (step S114). In the present embodiment, the linearly polarized light that exhibits a predetermined alignment direction is radiated from a light source 330 toward the film 306. In this manner, the linearly polarized light that exhibits a predetermined alignment direction is radiated thus cutting the bonding of molecules only in a specific direction to align the film 306. In FIG. 8, although the alignment treatment is applied to the film 306 by using photo-alignment treatment, as illustrated in FIG. 9, rubbing treatment that forms grooves by using a brush 340 may be performed to apply the alignment treatment to the film 306. Accordingly, the film 306 is aligned in a predetermined direction. In this manner, in the method for manufacturing the liquid crystal device, wiring, an alignment film, and spacers are formed on the first substrate 130A.

In this manner, the image display device 1 can be manufactured by the following procedures; that is, the spacers 136 are formed on the first alignment film 133 of the first substrate 130A, and the alignment treatment is applied to the first alignment film 133 after the spacers 136 are formed.

In the image display device 1, as illustrated in FIG. 7 to FIG. 9, the spacers 136 are formed and thereafter, the alignment treatment is applied to the first alignment film 133 thus keeping appropriately the portion of the alignment film 133 to which the alignment treatment is applied, and maintaining high performance of the alignment film 133.

For example, in the image display device 1, when the alignment treatment is applied to the alignment film 133 and thereafter, the spacers 136 are formed; that is, in such a structure that the alignment treatment is applied to the whole surface of the alignment film 133, and the spacers 136 are formed on the area to which the alignment treatment is applied, the characteristics of the alignment treatment applied to the area of the alignment film 133 on which the spacer 136 is not formed are changed by etching or the like when forming the spacers 136 and hence, abnormal alignment may be caused. When the spacers 136 are formed and thereafter, the alignment film 133 is formed, the shapes of the spacers 136 may be deformed when forming the alignment film 133 and hence, the spacers 136 may collapse. On the other hand, the image display device 1 adopts a structure such that the spacers 136 are formed and thereafter, the alignment treatment is applied to the first alignment film 133, and the alignment treatment is not applied to at least a part of the portion overlapped with the area of the first alignment film 133 on which the spacers 136 is formed, thereby suppressing the collapse of the spacer 136 and maintaining the alignment treatment of the first alignment film 133 in a preferred state. Accordingly, the failure due to the abnormal alignment and deterioration in yield can be suppressed.

When the spacers 136 are formed and thereafter, the alignment film 133 is formed by ink jet printing, the difference may be non-uniform between the thickness of the alignment film 133 formed around the circumference of the spacer 136 and the thickness of the alignment film 133 in the other portions. On the other hand, in the present embodiment, a film that constitutes the alignment film 133 is formed and thereafter, the spacers 136 are formed and hence, even when the film 306 is formed by ink jet printing, the alignment film 133 can be formed having a desired thickness in each position.

The alignment treatment is performed by photo-alignment treatment thus performing the alignment treatment irrespective of the arrangement of the spacers 136. The alignment treatment is performed by rubbing treatment thus enabling the use of various kinds of materials for the first alignment film 133, simple manufacture of a device, and cost reduction of the device. The method of the alignment treatment is not limited to the above-mentioned examples, and various kinds of alignment treatment can be used. For example, the alignment treatment may be performed by a method such as ion-beam alignment treatment.

In the image display device 1, when the condition of use is assumed such that an image viewer presses the surface of a variable lens array, in order to ensure the so-called strength against pressure applied onto the surface, it is preferable to use a spacer formed in a shape that extends in a predetermined direction. It is also preferable to form the spacer 136 in a shape having an aspect ratio close to 1 (one) as described in the present embodiment. Accordingly, the spacer 136 is hardly visible. The spacers 136 are arranged at random as described in the present embodiment thus making the spacers 136 hardly visible.

As a material that forms the liquid crystal layer of a variable lens array, a well-known material such as the nematic liquid crystal material mentioned above can be used. The material that forms a liquid crystal layer is not limited particularly.

Figure 10:
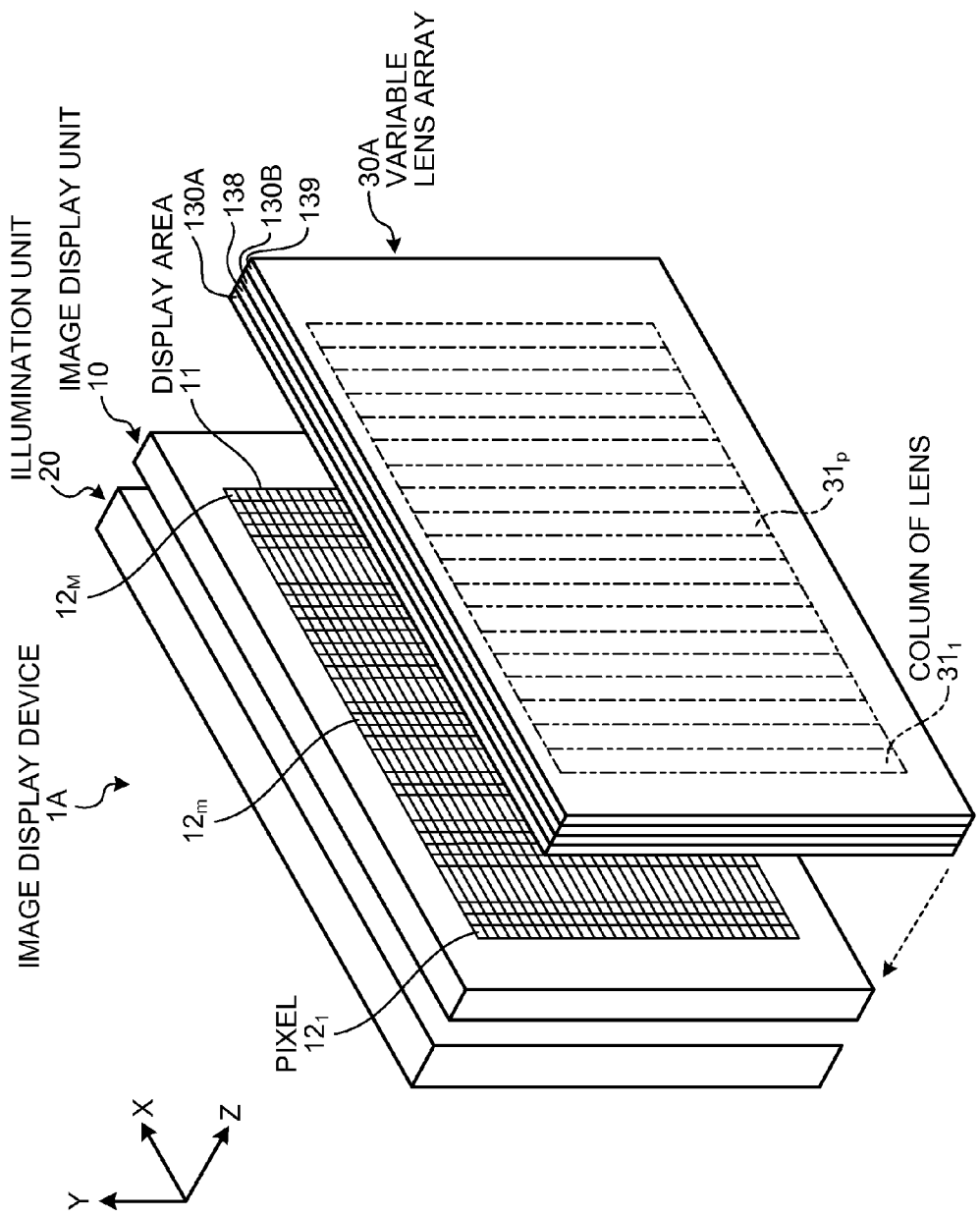
FIG. 10 is an exploded schematic perspective view of an image display device according to another embodiment.

FIG. 10 is an exploded schematic perspective view of an image display device according to another embodiment. Although a homogeneously aligned liquid crystal material is used for the liquid crystal layer 137 in the present embodiment, a twisted nematic (TN) liquid crystal material can also be used. When the twisted nematic (TN) liquid crystal material is used for the liquid crystal layer of a variable lens array, as an image display device 1A illustrated in FIG. 10, a variable lens array 30A arranges thereon a polarizer 139 on a side opposite to the liquid crystal layer of the second substrate 130B and hence, the image display device 1A becomes the display state same as the case of the image display device 1.

The surface shape of the first electrode in the first substrate and surface shape of the second electrode in the second substrate may appropriately be formed in a preferred shape depending on the specification of a variable lens array. For example, one of the first electrode and the second electrode may be a common electrode formed in a planar shape, the other electrode may be an electrode formed in a stripe shape, or both electrodes may be formed in a stripe shape. When a direct current voltage is continuously applied to a liquid crystal layer, deterioration in liquid crystal material may occur. To avoid it, in the same manner as the case of a general liquid crystal display panel, a variable lens array may be driven so that the polarity of the voltage between the first electrode and the second electrode is inverted sequentially. One of the two electrodes may be formed in a planar shape or in a stripe shape by patterning. An electrode formed in a striped manner in a horizontal direction constitutes a general liquid crystal lens, and an electrode formed in a striped manner in a perpendicular direction constitutes a variable lens suitable for the 3D viewing of a display panel.

Although the image display device 1 in the present embodiment arranges the variable lens array between an image display unit and an image viewer, the structure of the present disclosure is not limited to this case. The image display device may arrange a variable lens array between an image display unit (transmission type display panel) and an illumination unit.

Various kinds of conditions described in this specification are satisfied when established substantially as well as when established strictly. The existence of various variations in the conditions that arise in specification or manufacture is allowed.

2. Applicable Example

Next, an applicable example of the image display device 1 explained in the embodiment or the modification is explained. The image display device 1 according to the embodiment or the modification can be applied to electronic devices in various fields, such as a car navigation device, a television apparatus, a digital camera, a notebook personal computer, a mobile phone, a handheld terminal such as a portable game machine, and a video camera. That is, the image display device 1 according to the embodiment or the modification can be applied to electronic devices in various fields that display video signals input from the outside or generated therein as images or videos.

Figure 11:
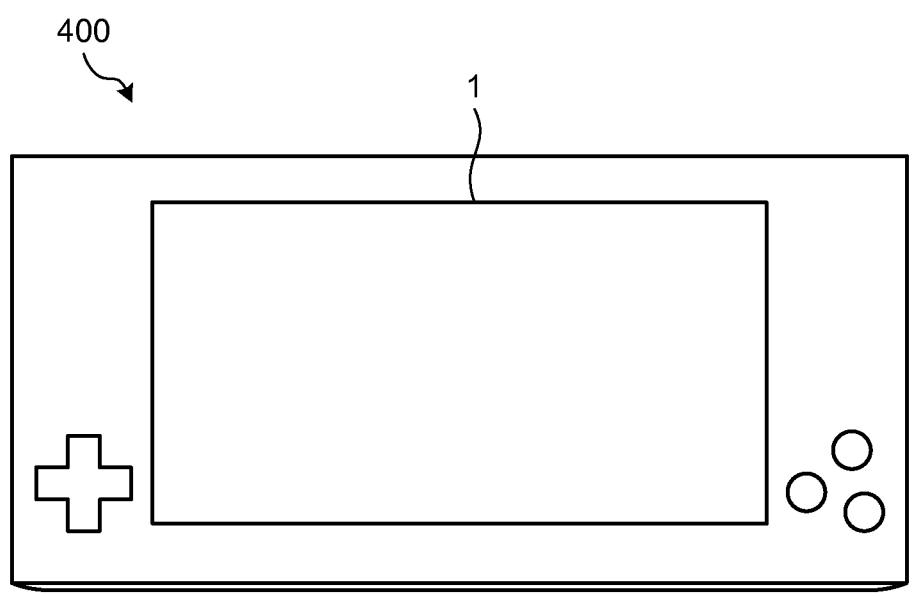
FIG. 11 is a view illustrating one example of an electronic apparatus that applies the image display device according to the present embodiment thereto.

FIG. 11 is a view illustrating one example of an electronic apparatus that applies the image display device according to the present embodiment thereto. FIG. 11 illustrates an example that mounts a display device on a portable game machine. For example, a display device 1 is, as illustrated in FIG. 11, arranged at the position surrounded by an operation panel 402 of a portable game machine 400. The portable game machine 400 is used by a user while viewing a screen and holding the both ends of the operation panel 402 of a housing with both hands. The image display device 1 is used thus displaying a game screen in a state that the screen can be viewed in a stereoscopic manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

<Aspect of Present Disclosure>

The present disclosure includes aspects as follows.

(1) A liquid crystal device including:

a first substrate, the first substrate being transparent;

a second substrate disposed opposite the first substrate, the second substrate being transparent;

a liquid crystal layer provided between the first substrate and the second substrate, the liquid crystal layer including liquid crystal molecules;

an alignment film with alignment treatment such that the liquid crystal molecules align, the alignment film being provided on a surface of the first substrate, the surface facing the liquid crystal layer; and pillar spacers provided on the alignment film, wherein the alignment treatment is applied to the alignment film except at least a part of area in which each of the pillar spacers overlaps with the alignment film.

(2) The liquid crystal device set forth in (1), wherein the alignment treatment is photo-alignment treatment.

(3) The liquid crystal device set forth in (1), wherein the alignment treatment is rubbing treatment.

(4) The liquid crystal device set forth in (1), wherein a relationship between a height and a width of the pillar spacers is as follows, 0.5 height/width 5.

(5) The liquid crystal device set forth in (1), further comprising: a first electrode with a stripe shape formed on a surface of the first substrate, the surface facing the liquid crystal layer;

a second electrode formed on a surface of the second substrate, the surface facing the liquid crystal layer; and a plurality of columns of lens provided between the first electrode and the second electrode, a refractive index of each of the plurality of columns of lens varies in accordance with a voltage applied between the first electrode and the second electrode so that the alignment direction of the liquid crystal molecules of the liquid crystal layer changes.

(6) An electronic device comprising the liquid crystal device set forth in (1).

(7) A method for manufacturing a liquid crystal device, the liquid crystal device including:

a first substrate, the first substrate being transparent;

a second substrate disposed opposite the first substrate, the second substrate being transparent;

a liquid crystal layer provided between the first substrate and the second substrate, the liquid crystal layer including liquid crystal molecules;

an alignment film with alignment treatment such that the liquid crystal molecules align, the alignment film being provided on a surface of the first substrate, the surface facing the liquid crystal layer; and pillar spacers provided on the alignment film, wherein the alignment treatment is applied to the alignment film except at least a part of area in which each of the pillar spacers overlaps with the alignment film, the method comprising:

forming a film to be an alignment film on the first substrate;

forming pillar spacers on the film; and applying alignment treatment to the film the pillar spacers having been formed thereon, so that the film comes into the alignment film.

(8) The method for manufacturing the liquid crystal device set forth in (7), wherein forming pillar spacers includes etching.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal device comprising:

a first substrate, the first substrate being transparent;

a second substrate disposed opposite the first substrate, the second substrate being transparent;

a liquid crystal layer provided between the first substrate and the second substrate, the liquid crystal layer including liquid crystal molecules;

an alignment film provided on a surface of the first substrate, the surface facing the liquid crystal layer; and pillar spacers provided on the alignment film, wherein the alignment film has areas where the pillar spacers overlap and to which no alignment treatment is applied.

2. The liquid crystal device set forth in claim 1, wherein a relationship between a height and a width of the pillar spacers is as follows, 0.5≤height/width ≤5.

3. The liquid crystal device set forth in claim 1, further comprising:

a first electrode with a stripe shape formed on a surface of the first substrate, the surface facing the liquid crystal layer;

a second electrode formed on a surface of the second substrate, the surface facing the liquid crystal layer; and a plurality of columns of lens provided between the first electrode and the second electrode, a refractive index of each of the plurality of columns of lens varies in accordance with a voltage applied between the first electrode and the second electrode so that the alignment direction of the liquid crystal molecules of the liquid crystal layer changes.

4. An electronic device comprising the liquid crystal device set forth in claim 1.

5. A method for manufacturing a liquid crystal device including:

providing a first substrate, the first substrate being transparent;

providing a second substrate disposed opposite the first substrate, the second substrate being transparent; and providing a liquid crystal layer between the first substrate and the second substrate, the liquid crystal layer including liquid crystal molecules, wherein the providing the first substrate includes:

applying an alignment film on a surface of the first substrate, the surface to face the liquid crystal layer;

forming pillar spacers on the applied alignment film; and applying alignment treatment to the alignment film except to areas where the pillar spacers overlap the alignment film.

6. The method for manufacturing the liquid crystal device set forth in claim 5, wherein the forming pillar spacers includes etching.

7. The method for manufacturing the liquid crystal device set forth in claim 5, wherein the alignment treatment is a photo-alignment treatment.

8. The method for manufacturing the liquid crystal device set forth in claim 5, wherein the alignment treatment is a rubbing treatment.

* * * * *